April 19, 1966  E. A. MEYER  3,246,440
FASTENER ASSEMBLY
Filed July 24, 1963  2 Sheets-Sheet 1
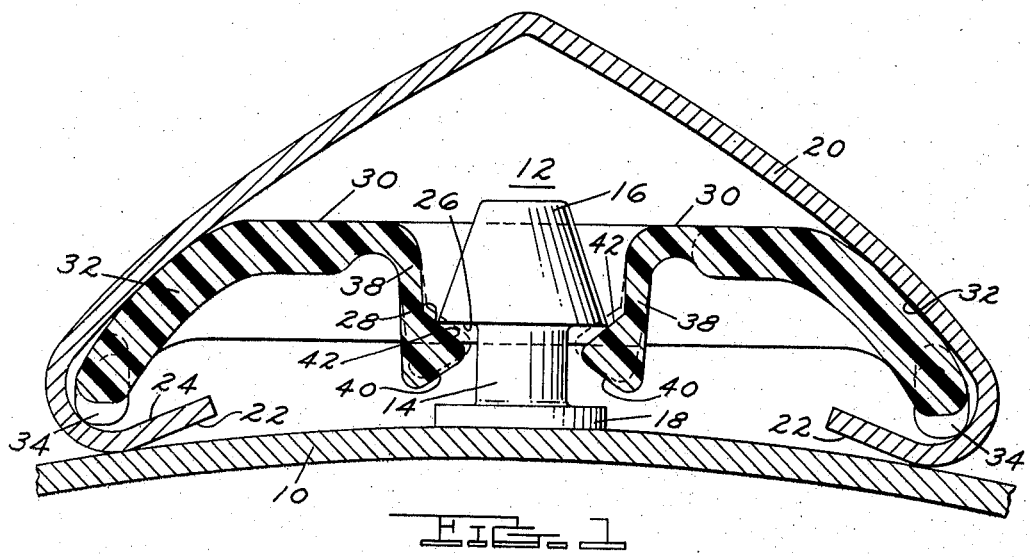
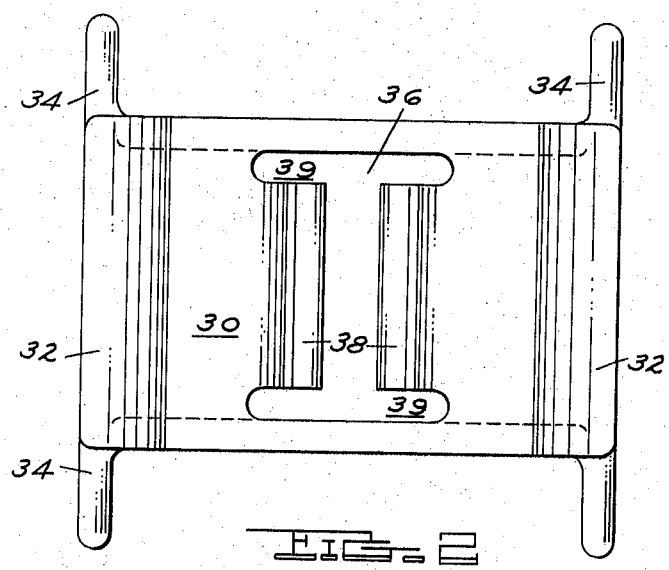
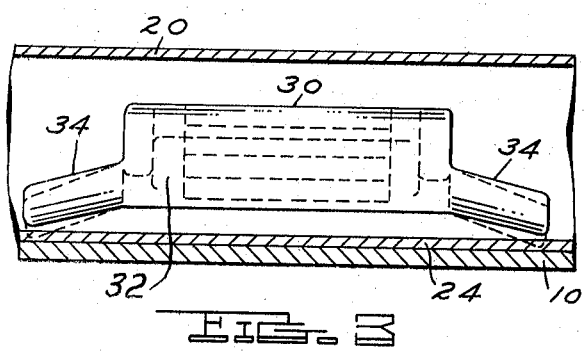
INVENTOR.
ENGELBERT A. MEYER
BY Burton & Parker
ATTORNEYS April 19, 1966     E. A. MEYER     3,246,440
FASTENER ASSEMBLY
Filed July 24, 1963     2 Sheets-Sheet 2
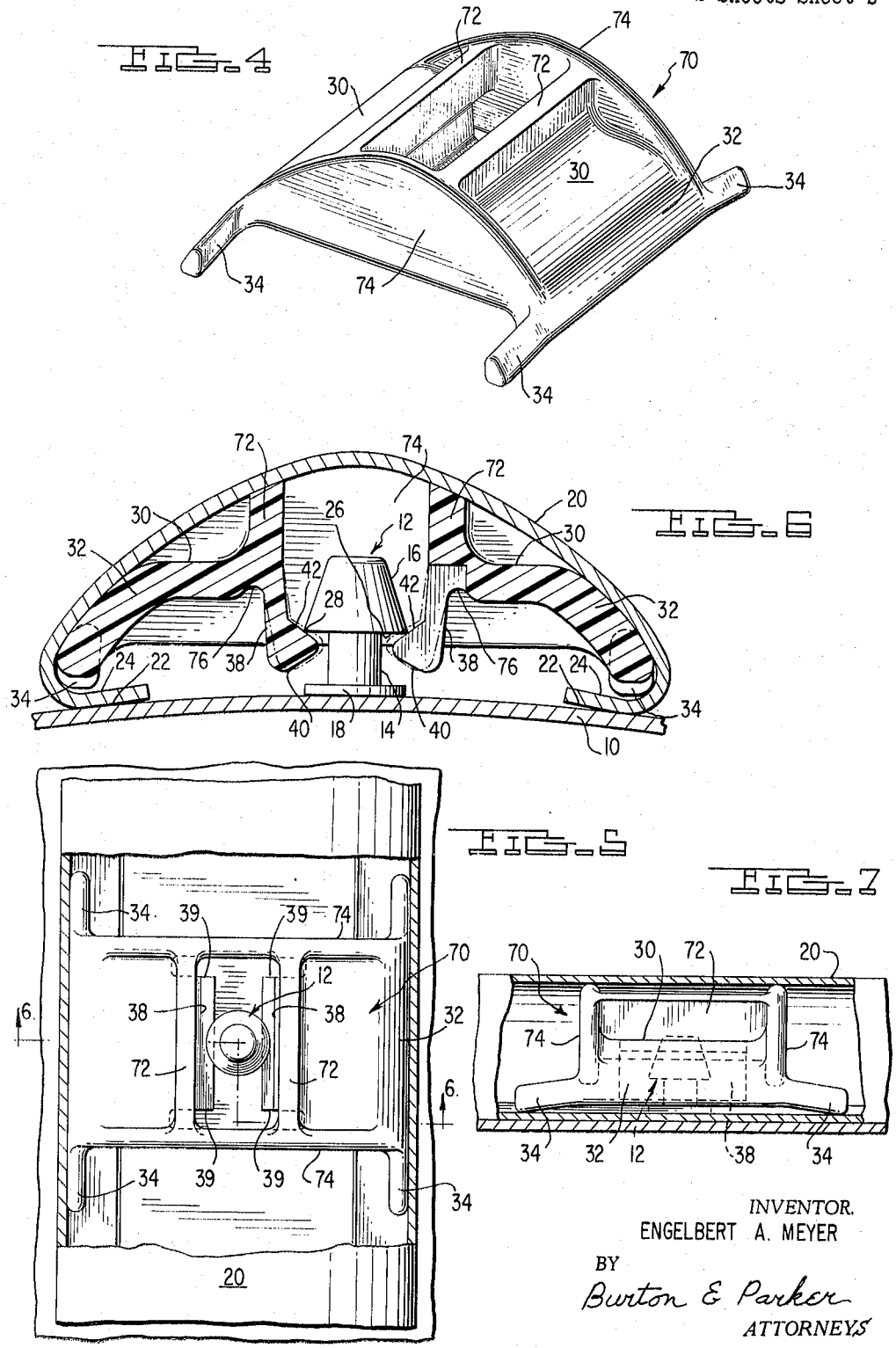
INVENTOR.
ENGELBERT A. MEYER
BY
*Burton & Parker*
ATTORNEYS

United States Patent Office 3,246,440
Patented Apr. 19, 1966

3,246,440
FASTENER ASSEMBLY
Engelbert A. Meyer, Union Lake Mich., assignor to Chicago United Products Company, Inc., Detroit, Mich., a corporation of Michigan
Filed July 24, 1963, Ser. No. 297,462
13 Claims. (Cl. 52—718)

This application is a continuation-in-part of my prior co-pending application Serial No. 279,286 filed May 9, 1963, for Fastener Assembly, and now abandoned.

This invention relates to an improved fastener assembly of the male and female type.

An object is to provide a fastener assembly of this character adapted particularly for use in attaching trim pieces or other generally similar parts to an automobile body though it is not restricted to such use.

Another object is the provision of a fastener assembly of the character set forth wherein the male fastener element is designed to be welded to the outer steel surface of an automobile body or other structure and is provided with a head portion spaced above the plane of the body, which head portion is adapted to be received and engaged by the female fastener element that is carried by a trim strip or other part adapted to be secured by the fastener to the outer surface of the body.

An object of the instant construction is that the female fastener element is formed of plastic and therefore will not rust or result in any electrolytic action with the other parts with which engaged. Also, due to the plastic construction of the female fastener, the male fastener is so constructed and provided with a sharp portion adapted to so engage the opposed portions of the plastic female fastener as to dig thereinto and positively interconnect therewith.

More particularly, an object is the provision of a fastener of a fastener assembly of the type wherein the connection between the female fastener element and the piece to which it is attached is such that said female fastener element may be readily adjustably positioned upon said piece, in order that such female fastener element will be properly disposed to engage the male fastener element that is attached permanently to the surface of the body when said piece carrying the female fastener element is juxtaposed properly upon the structure provided with the male fastener element.

This adjustable feature is important because it is common practice to provide trim strips or pieces of a decorative character adapted to be secured to an automobile body, which strips are provided with a plurality of female fastener elements adapted to engage a plurality of male fastener elements carried by the body to secure the strip to the body wall, and due to misalignment or variation in placement of fastener elements, it is commonly necessary to readjust the position of certain female fastener elements to properly engage the several male fastener elements fixed to the body wall.

While male and female fastener elements are commonly so associated together as to provide for disengagement of their interlocking engagement, such is not a common occurrence but it is important to have the interconnection of the fastener elements of such a character that the parts secured together by the fasteners are so held together as to prevent rattle or looseness that might result in noise or eventual accidental disconnection.

An object of this invention, therefore, is the provision of male and female fastener elements which so engage each other as to retain a tight and secure tensioned connection holding the parts which carry the fasteners securely together.

A meritorious feature is that the construction of the male fastener element is such as to permit ready interengagement of the male and female fastener elements and the construtcion of the female plastic fastener element is such that it is directly tensioned toward the male fastener to maintain a tight connection between the trim part and the automobile body in the embodiment of the invention illustrated.

Another object of this invention is the provision of a skeleton-like dome which extends upwardly from a substantially inverted U-shaped bridge-like portion and which includes upper longitudinal beams and transverse arches at the ends of and interconnecting the beams and the bridge-like portion. The spring fingers extend downwardly from the bight of the U of the bridge-like portion and the beams are connected to or integral with their respective fingers to strengthen same.

Other objects, advantages and meritorious features will more fully appear from the following specification, claims and accompanying drawings, wherein:

FIG. 1 is a cross sectional view through a fragment of an automobile body wall showing the outer wall surface and through a trim strip of conventional construction secured thereto by my improved fastener assembly;

FIG. 2 is a top plan elevation of the female fastener element;

FIG. 3 is a cross sectional view through the same parts shown in FIG. 1 but taken at an angle of 90° with respect thereto and does not include the male fastener element;

FIG. 4 is a perspective view of a preferred female fastener element;

FIG. 5 is a top plan view of the assembled parts with the trim strip cut-away to show the internal parts;

FIG. 6 is a cross sectional view taken on line 6—6 of FIG. 5 with the trim strip shown in full; and FIG. 7 is a cross side sectional view through the same parts shown in FIG. 6 but with the female fastener elements shown in full.

In the drawing 10 indicates in cross section a metal side wall of an automobile body showing the male fastener element 12 secured thereto by welding or the like. This fastener element is formed metal and comprises a shank portion 14 having at one end a head 16 which is generally of a conical shape as indicated. At the opposite end of the shank 14 there is a base 18 which may be welded or otherwise secured to the automobile body wall 10.

In the embodiment of the invention shown herein the same is illustrated as being employed to attach a trim strip 20, which may be of stainless steel or other suitable material, to the automobile body side wall. These decorative trim strips are in common use in the automobile industry and fasteners are generally employed to attach them to the automobile body, but it is common practice to provide such fasteners with parts that extend through apertures in the body wall for securement thereto. Such securement is disadvantageous in that the apertures through the body wall provide points where rust develops. As shown in the copending application of the assignee of the instant application, Serial No. 179,128, now Patent No. 3,153,468, the male fastener element may be welded to the steel side wall of the body and be so disposed as to interengage with a female fastener element carried by the decorative trim strip.

The decorative trim strip 20 here illustrated may have its opposite linear edges or flanges rolled over as at 22 to present smooth finished surfaces to the exterior surface of the side wall of the body. These rolled over edges define linear inwardly opening channels 24 within which opposite ends of the female fastener element may be received and supported as hereinafter set forth, for adjustable positioning linearly of the strip.

It will be noted that the male fastener element 12 has a head 16 of a generally conical shape mounted at one end of a shank 14, and the outer surface of such head slopes downwardly and outwardly to a base 26, which base presents a sharp hard edge or perimeter 28 for a purpose hereinafter more particularly described. This male fastener element is preferably formed of steel or the like so as to be readily welded to the metal side wall of the body.

The female fastener element is preferably desirably formed of a suitable plastic such as Celcon, Delrin or nylon. Such plastic may be readily shaped to the form shown and the portions of the female fastener which are directly engaged by the sharp projecting margin of the base of the head of the male fastener are relatively soft as compared with the hard edge of the male fastener and such edge digs in and engages itself into the surface of the female fastener to hold the same tightly thereto. This is important because secure interconnection of the two fastener elements is essential.

The female plastic fastener element is shown as having a base portion which is in the form of a flattened bridge-like part 30. Such bridging part 30 terminates at opposite ends in two side wall or leg portions 32 as shown in FIGS. 2 and 3. These leg portions 32 are bent angularly in the same general direction out of the plane of the base 30 as illustrated particularly in FIG. 1. Each leg is provided with two oppositely directed feet 34 as shown particularly in FIG. 2. These feet extend in opposite directions away from the leg and are resilient. They are bent angularly from the plane of the leg somewhat as shown in FIG. 3. Due to their angularity of position and resiliency, they are tensioned when received in the channels 24 as shown in FIGS. 1 and 3 and as indicated in dotted outline in FIG. 3, so as to frictionally hold the fastener element at positions to which adjusted within the channel.

As hereinabove stated when the opposite ends or legs 32 of the female fastener are received within the channels 24 of the strip 20, the feet 34 are flattened somewhat from their bowed shaped so as to be resistingly tensioned in place within the channels 24 to position this female fastener element at desired locations linearly of the strip 20. It is necessary that these female fasteners be properly located linearly of the strip 20 so that, when such strip is placed in overlying relationship upon the body of the automobile superposing the male fastener elements 12, the female fastener elements will be properly located to inter-engage with the several male fastener elements which are permanently attached to the body wall.

The body of the female fastened 30 is cut away as shown at 36 to provide two opposed spaced apart spring fingers 38 which are bent out of the plane of the body or bridging part 30 as illustrated particularly in FIG. 1. These opposed spring fingers 38 are so shaped as to be spread apart when the female fastener is pressed over the conical head of the male fastener and into interengagement therewith. It will be seen that the spring fingers 38 are not only freely supported by the bridging portion 30 of the female fastener but are cut away as at 39 therefrom so as to provide for the desired flexibility of movement.

Each spring finger 38 terminates in a free end portion which end portion exhibits an outer angular face 40. This outer face 40 is so shaped as to slide readily over the angular face of the head of the male fastener and spread the fingers 38 resistingly apart. These outer faces are disposed in opposition to each other and are complementary. Each slopes outwardly away from the male fastener and downwardly toward that end of the shank of the male fastener which is opposite to the head supporting end of the male fastener as shown particularly in FIG. 1. This spreading apart of the spring fingers is indicated by the dotted lines shown in FIG. 1.

The outer end portion of each spring finger is also shown as provided with inner faces 42 which slope inwardly toward each other and toward the shank of the male fastener and downwardly toward the base 18 of the shank 14 of the male fastener. These inner faces 42 of the spring fingers are adapted to be engaged underneath the base 26 of the head 16 of the male fastener element. They are adapted to be directly engaged by the projecting sharp hard edge of the base of the conical head. This sharp projecting means, being considerably harder than the surfaces 42 of the spring fingers which it engages, is adapted to dig into such surfaces and securely interengage the two fastener elements together to maintain a tension holding the strip 20 toward the body wall. The character of the interengagement of the edge of the metal male fastener head with the plastic beveled surfaces of the plastic female fastener prevents the spring fingers 38 of the plastic female fastener element from spreading apart and releasing the male fastener. The plastic female fastener strongly resists direct outward movement over the head of the male fastener. This tension interconnection is of such a character that it holds the trim strip snugly against the wall of the body and prevents rattle or looseness or displacement thereof, and with a plastic fastener such digging in of the edge of the base of the male fastener head is most desirable.

Referring now to FIGS. 4-7, it will be noted that the preferred embodiment shown includes a skeleton-like dome 70 extending upwardly from the previously discussed flattened bridge-like part or portion 30, the dome 70 providing lateral and longitudinal strengthening of the female fastener element as well as rigidity against torsional stresses.

Like parts in FIGS. 4-7 carry the same numerals as in FIGS. 1-3; the description of these similarly numbered parts applies to FIGS. 4-7.

The spring fingers 38, 38, however, are not freely supported by the bridge members 30, 30 as in FIGS. 1-3 but rather are connected to or integral with outer longitudinal beams 72, 72 which extend the full longitudinal length of the bridge members 30, 30 and span the cut away portions 39, 39 and connect at their ends integrally with transverse arches 74, 74 which extend downwardly to and below the bridge-like part 30 being connected thereto by integral formation therewith. Preferably, the transverse arches 74, 74 substantially conform to the predetermined inside surface design of the trim strip 20 to aid in frictionally maintaining the desired position of the female fastener element in the trim strip and also to transmit installation pressing forces on the trim strip to the spring fingers 38.

It will be understood that the design of the top surface of the skeleton-like dome 70 may be altered to suit the requirements of the various trim strip shapes.

The transverse aches 74, 74 and their associated longitudinal beams 72, 72 serve to maintain, in cooperation with leg portions 32, 32 and the four feet 34, sound alignment and orientation of the female fastener element in the trim strip 20 even under severe stress such as might occur if the female fastener element was not longitudinally aligned within the trim strip to enable easy entry of the male fastener element. Twisting, buckling, and incomplete attachment is avoided since the conically tapered head 16 would engage one of the transverse arches 74, 74 and cam the female fastener element longitudinally into acceptable alignment for locking with the spring fingers 38, 38. The transverse arches 74, 74 are rigidified and strengthened by longitudinal beams 72, 72 to a degree sufficient to withstand the forces of longitudinal alignment during assembly without detrimental bending or twisting which would result in failure to accomplish the desired connection.

Relief grooves 76, 76 are provided at the lower junctures of spring fingers 38, 38 with the bridge-like parts 30, 30, these relief grooves 76, 76 being less than half the thickness of the bridge-like parts 30, 30, thereby providing the desired flexibility with destruction of structural integrity.

What I claim is:

1. An assembly comprising a combination a male fastener element having a shank provided at one end with a generally cone-shaped head having a base spaced from the opposite end of the shank, and a female fastener provided with opposed spaced apart spring fingers adapted to be resistingly spread apart to be received over said head and engaged therewith to interlock said fastener elements together, the lower portion of said female fastener element having a longitudinal inverted U-shaped bridging portion with said fingers extending downwardly from the bight of the U, the upper portion of said female fastener element having a skeleton-like dome including upper longitudinal beams each of which extend upwardly from the top of its respective spring finger, said dome including transverse arches which extend downwardly from the ends of the beams to and below the bight of the U of the bridging portion, the top surfaces of said beams and said arches being of a predetermined shape to define a predetermined planar surface complementary to the shape of the part to be attached to said female fastener element.

2. A fastener assembly as defined in claim 1 characterized in that said bridging portion is transversely cut away at the bight of the U thereof adjacent said transverse arches and the transverse ends of said spring fingers.

3. An assembly as defined in claim 1 characterized in that the legs of the U of the bridging portion have oppositely projecting resilient feet portions extending substantially longitudinally from the bottom ends thereof and being bowed whereby they may be positioned in a tensioned condition between two spaced parts of another structural element to releasably frictionally position the female fastener element adjustably with respect thereto.

4. An assembly as defined in claim 1 and including a longitudinally extending hollow trim strip having longitudinally extending bottom opposed flanges which define channels along the longitudinal edges of the trim strip, said female fastener assembly being releasably frictionally positioned within said trim strip with the outer surfaces of the legs of the bridging portion and the dome engaging the inner surface of said trim strip.

5. A male and female fastener assembly for securing two structural parts together comprising, in combination: a metal male fastener element having a shank adapted to be secured at one end to one of the structural parts and provided at the other end with a generally cone-shaped head having a peripheral sharp edge at the base of the head spaced from the said one end of the shank, and a plastic female fastener element adapted to be secured to the other structural part and provided with opposed spaced apart discrete spring fingers adapted to be resiliently spread apart to be received over said head and tensioned thereagainst, said fingers having opposed inclined inner surfaces adapted to extend angularly across said peripheral sharp edge of the head and being of relatively softer material than said peripheral sharp edge to be bitingly engaged thereby to interlock said fastener elements together.

6. A fastener assembly as defined in claim 5 characterized in that the end portions of the fingers are provided with downwardly sloping surfaces adapted to slide over the head, and said end portions being resistingly spread apart as said surfaces slide over the head.

7. A fastener assembly as defined in claim 5 characterized in that the said other structural part has opposed channels, and the female fastener element has opposite bowed resistingly deformable end portions adapted to be received in tensioned engagement within said opposed channels.

8. A fastener assembly as defined in claim 5 characterized in that the head of the male fastener element slopes from its free end outwardly away from the shank and downwardly toward the opposite end of the shank and the base of such head is a sharp hard edge, and further characterized in that the ends of the spring fingers of the female fastener have opposed downwardly and outwardly sloping inner surfaces adapted to be received over the head of the male fastener element spreading said spring fingers resistingly apart, and said opposed inclined inner surfaces slope inwardly and downwardly to be received underneath the base of the head of the male fastener element and to be bitingly engaged by the hard sharp edge thereof.

9. A fastener assembly as defined in claim 5 characterized in that said other structural part has opposed channels, and the female fastener element is provided with a bridging portion which has opposite resilient bowed ends adapted to be resistingly flattened when received within opposed channels of said other structure part to frictionally releasably position said fastener element at adjusted positions linearly within said channels, and which bridging portion has said spring fingers formed therefrom and bent angularly out of the plane thereof to be received over the head of the male fastener element.

10. A fastener assembly as defined in claim 5 characterized in that said other structural part has two spaced portions, and the female fastener element is provided with a bridging portion which has oppositely projecting resilient leg portions each provided with two oppositely projecting resilient feet portions adapted to be engaged in tension between said two spaced portions of the other structural part to releasably frictionally position the female fastener element adjustably with respect thereto.

11. A fastener assembly as defined in claim 5, characterized in that said other structural part is a channel having side walls, and said female fastener element comprises a bridging portion having opposite ends each bent in the same general direction angularly out of plane of the bridging portion, each end being provided with two resilient feet projecting in opposite directions away from said end and out of the plane thereof to be resistingly displaced when said end is received between the side walls of the channel to which the fastener element is adapted to be attached, said bridging portion being cut away intermediate said ends to define said spring fingers which fingers are bent out of the plane of the bridging portion in the same general direction as the ends but spaced therebetween, the free ends of said fingers being spaced apart and having said opposed inclined inner surfaces which are complementary and slope away from the bridging portion and inwardly toward each other, and said free ends of the fingers having complementary opposed downwardly facing surfaces sloping away from the bridging portion and outwardly away from each other for co-action with the head of the male fastener element to cause said fingers to be spread apart when the fingers are pressed over said head.

12. A fastener assembly as defined in claim 5 characterized in that the female fastener element is of a broad, generally U-shape configuration and the bridging base of the U is cut away between the two legs of the U providing said two spring fingers bent inwardly of the U and adapted to be sprung over the head of the male fastener element.

13. A male and female fastener assembly for securing in overlying relation to the surface of a first structural part, a second structural part having opposed channels connected by an intermediate portion, comprising, in combination: a male fastener means adapted to be secured to the surface of said first structural part and having downwardly extending outwardly tapered camming surfaces at its upper end and downwardly facing fastener retaining surfaces therebelow, and female fastener means adapted to be secured to the second structural part whereby such part and the female fastener therewithin may be connected as a unit to the first structural part by pressing the structural parts together, said female fastener means having a body provided with opposed downwardly extending spring fingers adapted to be resistingly spread apart by co-action with said camming surfaces of the male fastener means when the body is pressed downwardly thereover to lock against said fastener retaining surfaces, said body having a plurality of outwardly extending discrete resilient feet resistingly distortable for reception within the opposed channels of the second structural part and independently conforming thereto to facilitate sliding movement of the body along the channels for predetermined positioning within such part, and said feet wedging the body upwardly against said intermediate portion to prevent upward displacement of the body within the second structural part during pressing of said structural parts together.

References Cited by the Examiner

UNITED STATES PATENTS

| | | | |
|---|---|---|---|
| Re. 24,889 | 10/1960 | Tupper | 215—41 X |
| 2,103,743 | 12/1937 | Doty | 85—32 X |
| 3,038,747 | 6/1962 | Rapata | 292—17 |
| 3,132,727 | 5/1964 | Meulenberg et al. | 24—73 |

FOREIGN PATENTS 968,755  3/1968  Germany.

RICHARD W. COOKE, *Primary Examiner.*

FRANK L. ABBOTT, *Examiner.*